United States Patent
Ashley et al.

[11] Patent Number: 6,016,330
[45] Date of Patent: Jan. 18, 2000

[54] ENCODING AND DETECTION OF BALANCED CODES

[75] Inventors: Jonathan James Ashley, Los Gatos; Brian Harry Marcus, Los Altos, both of Calif.

[73] Assignee: International Business Machines Corporation, Armonk, N.Y.

[21] Appl. No.: 08/733,409

[22] Filed: Oct. 18, 1996

[51] Int. Cl.[7] ............ H04L 27/06; G06F 11/00; G06F 11/10
[52] U.S. Cl. ............ 375/341; 371/30; 371/43.7; 371/43.8
[58] Field of Search ............ 375/341; 371/30, 371/43.4, 43.6, 43.7, 43.8

[56] References Cited

U.S. PATENT DOCUMENTS

| | | | |
|---|---|---|---|
| 4,486,739 | 12/1984 | Franaszek et al. | 341/59 |
| 4,837,843 | 6/1989 | Owechko | 382/31 |
| 4,869,574 | 9/1989 | Hartman | 350/162.13 |
| 4,932,741 | 6/1990 | Pernick et al. | 350/3.73 |
| 5,067,023 | 11/1991 | Kim | 358/261.1 |
| 5,095,194 | 3/1992 | Barbanell | 235/379 |
| 5,220,622 | 6/1993 | Scarr | 382/31 |
| 5,257,272 | 10/1993 | Fredrickson | 371/43 |
| 5,280,489 | 1/1994 | Fredrickson et al. | 371/45 |
| 5,740,184 | 4/1998 | Heanue et al. | 371/30 |

OTHER PUBLICATIONS

Fred Halsall, Data Communications, Computer Networks and Open Systems, 4th ed., pp. 872–875, 1995.

*Primary Examiner*—Stephen Chin
*Assistant Examiner*—Albert Park
*Attorney, Agent, or Firm*—James C. Pinter; Morgan & Finnegan, L.L.P.

[57] ABSTRACT

The present invention is an apparatus and method for detecting a codeword from a data stream comprising a series of sequences of samples representing intensities of an analog signal. The data stream may be output from, for example, a holographic storage device. The data stream is encoded using a code which may be represented by a trellis. One embodiment of the present invention uses a block encoded balanced code, one embodiment uses a finite state encoded balanced code and another embodiment uses a finite-state encoded DC free code. Each code defines a set of codewords which meet the constraints of the code. The codewords are detected from a sequence of samples by selecting the codeword having the greatest correlation with the sequence of samples. In a preferred embodiment, the correlation detection is implemented using the Viterbi process to iteratively determine correlations and codewords for each state at each level of the trellis based on the correlations at the preceding level of the trellis.

4 Claims, 13 Drawing Sheets

ENCODING AND DETECTION OF BALANCED CODES

FIELD OF THE INVENTION

The present invention relates to detection of data encoded with a balanced or DC free code by correlation of samples with codewords of the code.

BACKGROUND OF THE INVENTION

In many communication and storage systems, variations in signal strength cause problems in detection. One such example is a holographic storage system.

Figure 1A:
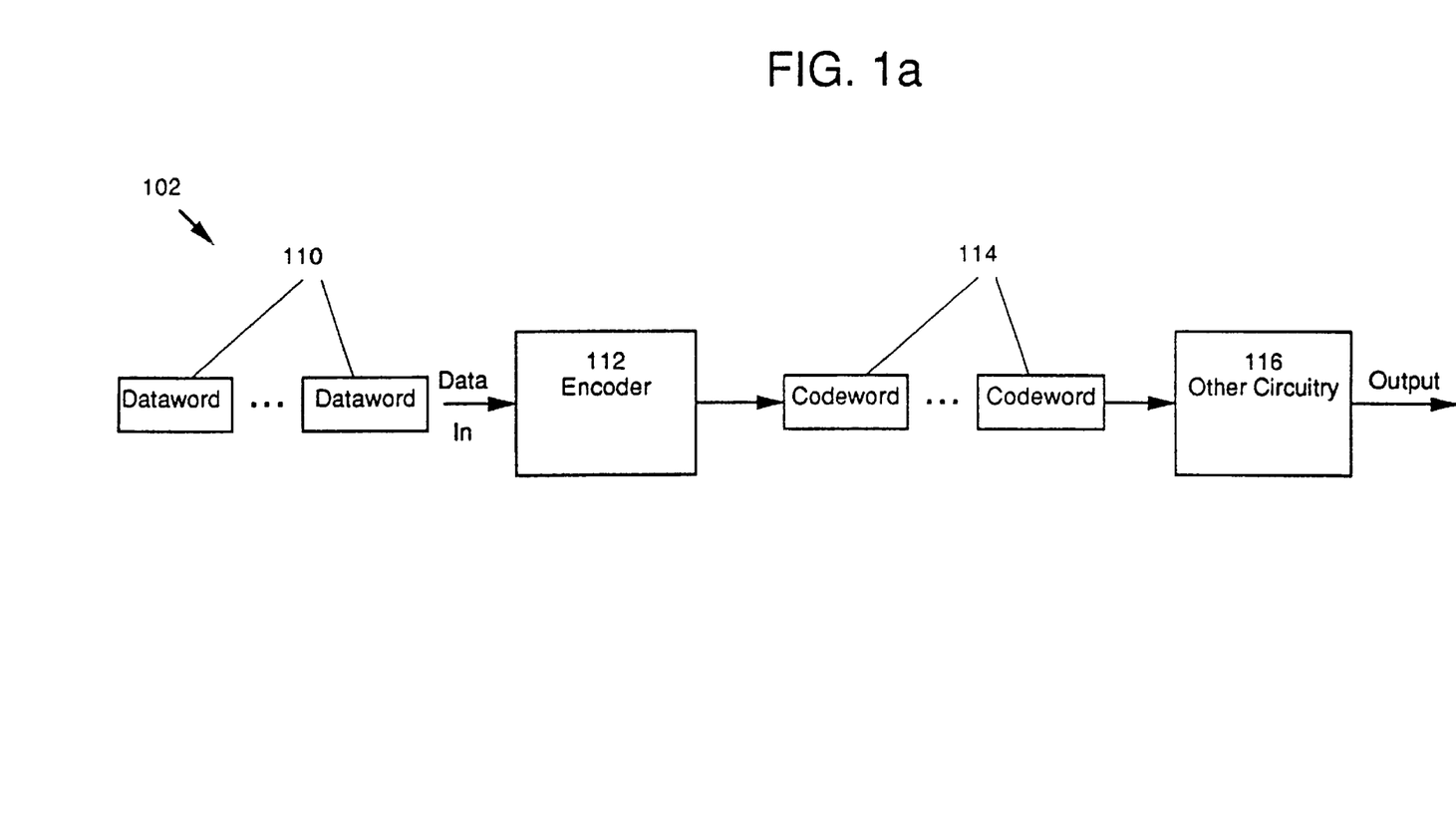
FIG. 1a is a block diagram of a write apparatus 102.

FIG. 1a is a block diagram of a write apparatus 102. Encoder 112 accepts as its input digital data in the form of units known as datawords 110. The input data is encoded to a form suitable for recording and output from encoder 112 in the form of units known as codewords 114. The codewords may input to other write apparatus circuitry 116, which outputs a signal which controls the actual recording of the data.

Figure 1B:
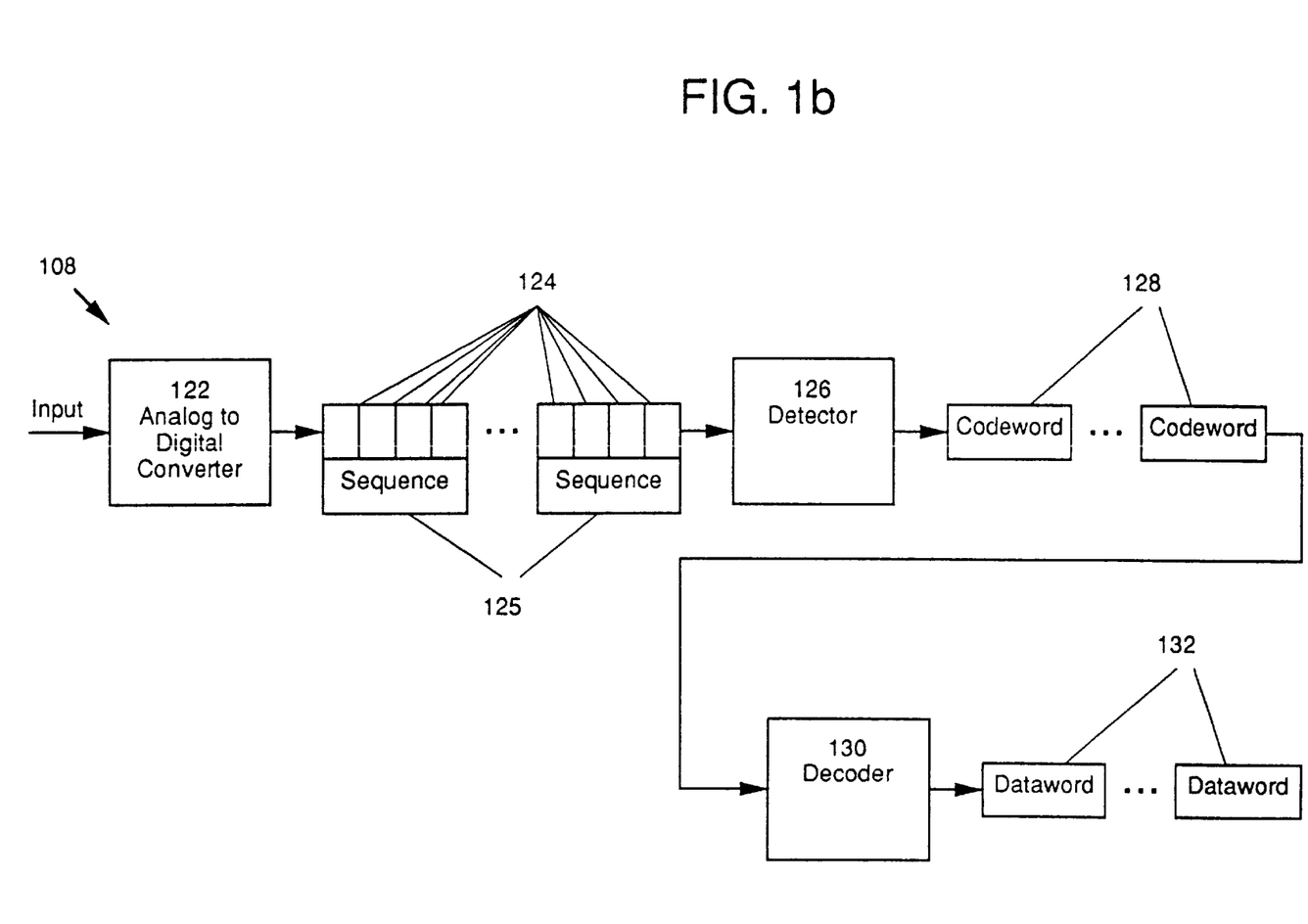
FIG. 1b is a block diagram of a read apparatus 108.

FIG. 1b is a block diagram of a read apparatus 108. The analog signal from the read channel is input to analog to digital converter (ADC) 122 of read apparatus 108, which outputs a digital signal comprising units known as samples 124. Each sample represents the intensity of the analog signal at one point. A series of samples is represented in 124. A plurality of samples 124 are grouped together to form a sequence 125 of samples. Sequences 125 are input to detector 126, which reconstructs the original data which were input for recording, based on samples 124. The reconstructed codewords 128 are output from detector 126. The reconstructed datawords 132 are output from decoder 130. In practice, the detector and decoder may be combined.

Figure 1C:
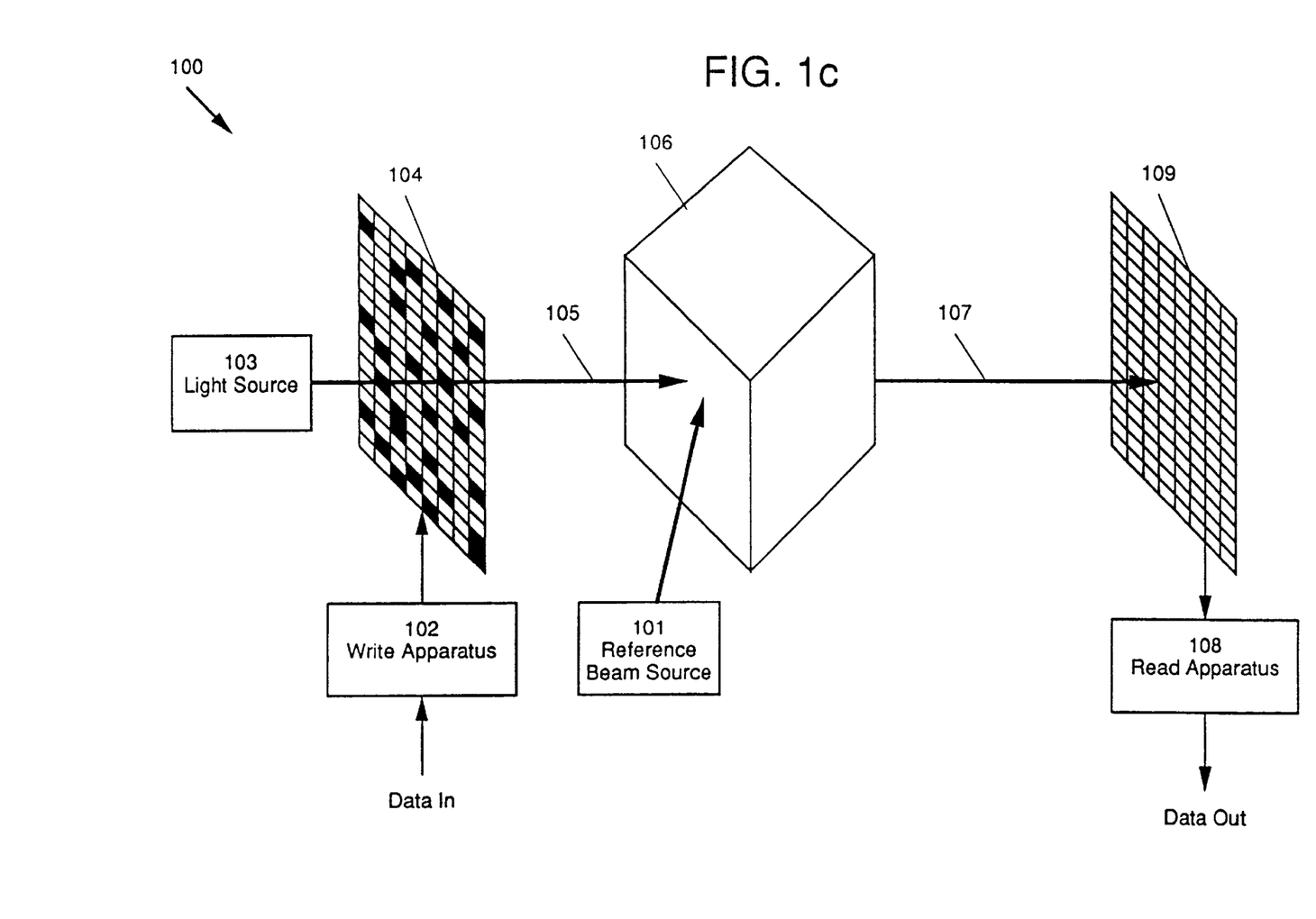
FIG. 1c is an exemplary block diagram of a holographic storage device 100 incorporating write apparatus 102 of FIG. 1a and read apparatus 106 of FIG. 1b.

FIG. 1c depicts the application of read apparatus 108 of FIG. 1b and write apparatus 102 of FIG. 1a to a holographic storage device. The holographic storage device accepts its input from write apparatus 102 of FIG. 1a, which accepts as its input the data to be recorded, encodes the data and converts it to a signal which controls spatial light modulator (SLM) 104. SLM 104, which is illuminated by laser light source 103, converts the laser light into an optical signal 105 representing the input data. The interference pattern between signal 105 and a reference beam from reference beam source 101 is recorded in holographic medium 106. Charge coupled device (CCD) array 109 accepts as its input an optical signal 107 output from holographic medium 106 and outputs an analog electrical signal representing the illumination intensity of each pixel in the CCD. This signal is output from the holographic storage device to read apparatus 108 of FIG. 1b, which converts the analog signal into digital signals, and decodes the signals to recover the recorded data.

In a typical holographic storage application, a codeword bit value of 1 is written using an on or illuminated pixel and a bit value of 0 is written using an off or unilluminated pixel. Of course, the opposite illumination arrangement could be used instead. The codewords are written as arrays, each having the same dimensions, on the SLM. For example, a codeword having length 12 may be written as a 3 by 4 array. A sequence of codewords is rastered across the SLM. For example, if each codeword is written as a 3 by 4 array, then the first three rows of the SLM are first filled in by a sequence of 3 by 4 arrays, then the next three rows, and so on, until the entire SLM is filled in.

When written, each pixel is illuminated with a fully on or fully off light source. When a codeword is read from the holographic memory, the light received by CCD camera 109 is not free from distortion. Typically, pixels of the CCD receive neither fully on nor fully off illumination, but rather partially on and partially off illumination. The samples output from ADC 122 reflect this partial illumination. Detector 126 must estimate the actual codeword being output based on the sequence of samples received from ADC 122.

A well-known detection system is threshold detection. Threshold detection means that a threshold value for samples is established. All samples greater in value than the threshold are considered to be 1's and all samples lesser in value than the threshold are considered to be 0's. Threshold detection has two main problems. First, the threshold must be computed. Typically, the values of a large number of samples must be averaged in order to compute the threshold. This produces a large amount of computational overhead which decreases the performance and increases the cost of the detection system. Second, noise in the optical or electrical signals significantly increases the error rate of the detection system. An increased error rate requires a more complex error correction scheme, which raises the cost and lowers the performance of the detection system. If the error rate becomes too high, it may be impossible to correct all the errors. The result is a loss of data, which could be catastrophic. What is required is a detection system with decreased computational overhead and more robust noise performance.

One solution to the problems inherent in threshold detection is the use of balanced codes. A balanced code is one in which each codeword is balanced—it contains exactly the same number of 1's as 0's. Use of a balanced code eliminates the need to compute a threshold. Since the number of 1's and 0's is balanced, the brighter 50% of the samples are considered to be 1's and the dimmer 50% of the samples are considered to be 0's. In addition, the minimum distance, the minimum number of bits by which two distinct codewords differ, is 2. In a balanced code, a change in just one bit yields an invalid codeword because the result is unbalanced. To remain in balance, at least two bits must change. The larger the minimum distance, the easier it is to distinguish among distinct codewords. The minimum distance of a balanced code can be made larger if desired.

Balanced codes belong to a general class of codes known as DC free codes. Each codeword in a DC free code is not necessarily balanced, but the imbalance over a code sequence of arbitrary length is bounded. DC free codes have advantages similar to those of balanced codes.

Problems arise in the use of balanced or DC free codes. Prior art detection schemes are not complete. If the detected word is not a valid codeword, current detection schemes cannot, by themselves, handle the error. While this may be adequate for storage devices with very clean output signals, it is not adequate for holographic storage devices, or any other devices which have relatively noisy and distorted output signals. Furthermore, current balanced code detection schemes are inefficient in that they require considerable sorting, which increases the cost and decreases the performance of the detector.

SUMMARY OF THE INVENTION

The present invention is an apparatus and method for detecting a codeword from a data stream comprising a series of sequences of samples representing intensities of an analog signal. The data stream is encoded using a code which may be represented by a trellis. One embodiment of the present invention uses a block encoded balanced code, another embodiment uses a finite state encoded balanced code, and yet another embodiment uses a finite-state encoded DC free code. Each code defines a set of codewords which meet the constraints of the code. The codewords are detected from a sequence of samples by selecting the codeword having the greatest correlation with the sequence of samples. In particular, knowledge of the ideal intensity values corresponding to 0 and 1 is not needed. In a preferred embodiment, the correlation detection is implemented using the Viterbi process to iteratively determine correlations and codewords for each state at each level of the trellis based on the correlations at the preceding level of the trellis.

The use of balanced or DC free codes eliminates the need for threshold detection. Using the Viterbi process to iteratively detect the codewords is much more efficient than prior detection schemes for balanced or DC free codes.

BRIEF DESCRIPTION OF THE DRAWINGS

The details of the present invention, both as to its structure and operation, can best be understood by referring to the accompanying drawings, in which like reference numbers and designations refer to like elements.

FIG. 8b is a simplified representation of trellis 800 of FIG. 8a.

DETAILED DESCRIPTION OF THE INVENTION

Figure 2:
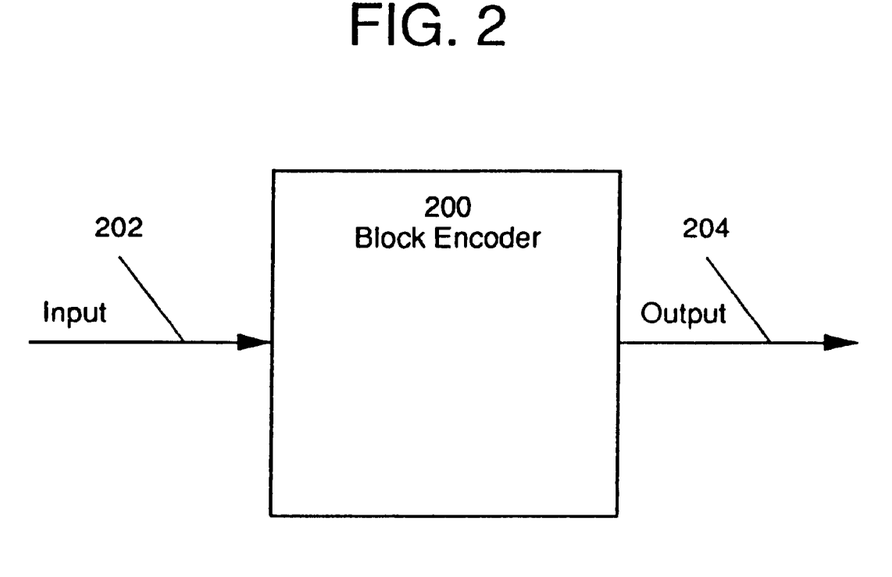
FIG. 2 is a block diagram of a block encoder 200, which encodes a stream of datawords using a block code.

FIG. 2 is a block diagram of a block encoder 200, which encodes a stream of datawords. A block encoder accepts a dataword and outputs a corresponding codeword. The output codeword depends only on the current input dataword.

Figure 3:
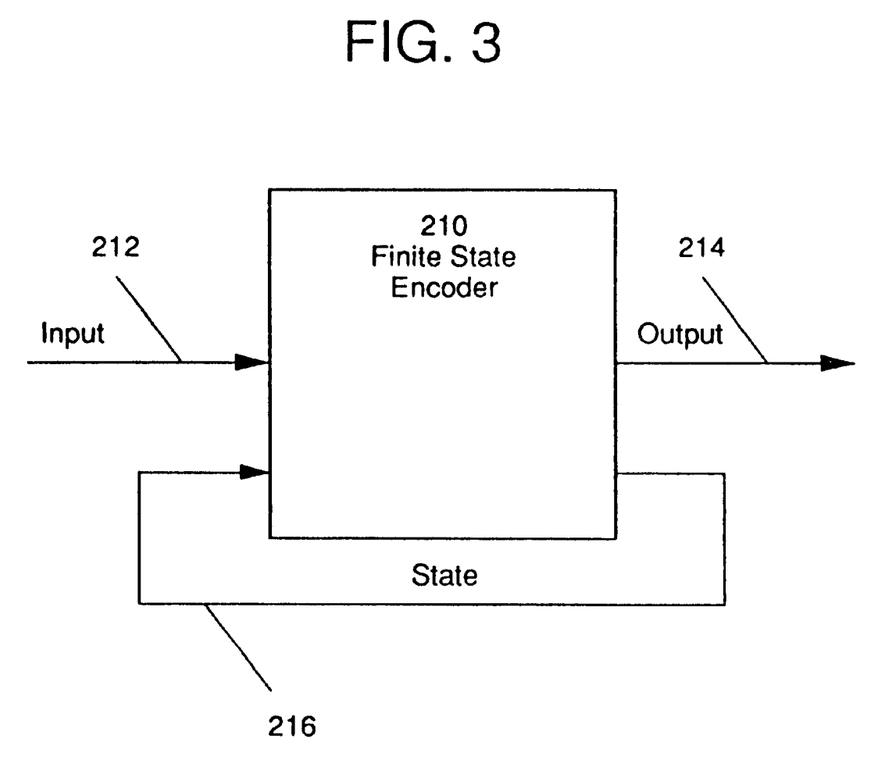
FIG. 3 is a block diagram of a finite-state encoder 210, which encodes a stream of datawords using a finite-state code.

FIG. 3 is a block diagram of a finite-state encoder 210, which encodes a stream of datawords. A finite-state encoder accepts a dataword and outputs a corresponding codeword. However, the codeword output depends not only on the input dataword, but also on the current state of the encoder, which is determined by previous datawords which were input. In addition to the codeword, a finite-state encoder also outputs state information 216 which is fedback as an input to the encoder.

One aspect of the present invention is the detection of data from a stream of digital samples representing intensity values. For a block encoded balanced code, the detection process is conceptually quite simple. The estimated binary codeword $b=b_0 b_1 \ldots b_{l-1}$ is chosen as the codeword that maximizes the correlation $<b,y>$ with the corresponding sequence of samples $y=(y_0, y_1, \ldots y_{l-1})$. The correlation is the well-known dot product:

$$\langle b, y \rangle = \sum_{i=0}^{i-1} b_i y_i = \sum_{b_i=1} y_i.$$

In other words, the sample sequence y is correlated to each possible codeword b. The codeword which has the maximum correlation is selected as the codeword to output from the detector. When there are a large number N of codewords, it is inefficient to compute the correlation $<b,y>$ for each of the N codewords in turn. In a preferred embodiment, the present invention avoids this time-consuming computation by using a version of the Viterbi process instead.

The Viterbi process is based on a trellis description of a code. A trellis for a block code is defined as having one state at the top, one state at the bottom and several states at intermediate levels. Each state at level d leads to one or more states at level d+1. By convention, transitions going down and to the left are labeled 0 and those going down and to the right are labeled 1. The codewords of the code are the labels of paths traversing the trellis from the top state to the bottom state. Each path from the top state to some other state of the trellis may be regarded as generating a prefix of a codeword. Accordingly, given any state s, there is a set of paths from the top state to state s, and a corresponding set, P(s), of words which are prefixes of codewords. For a state s, at level d, c(s) is defined to be the maximum correlation of the level d prefix of the received word with words in P(s), and p(s) is defined to be the level d prefix which achieves this maximum.

Figure 4:
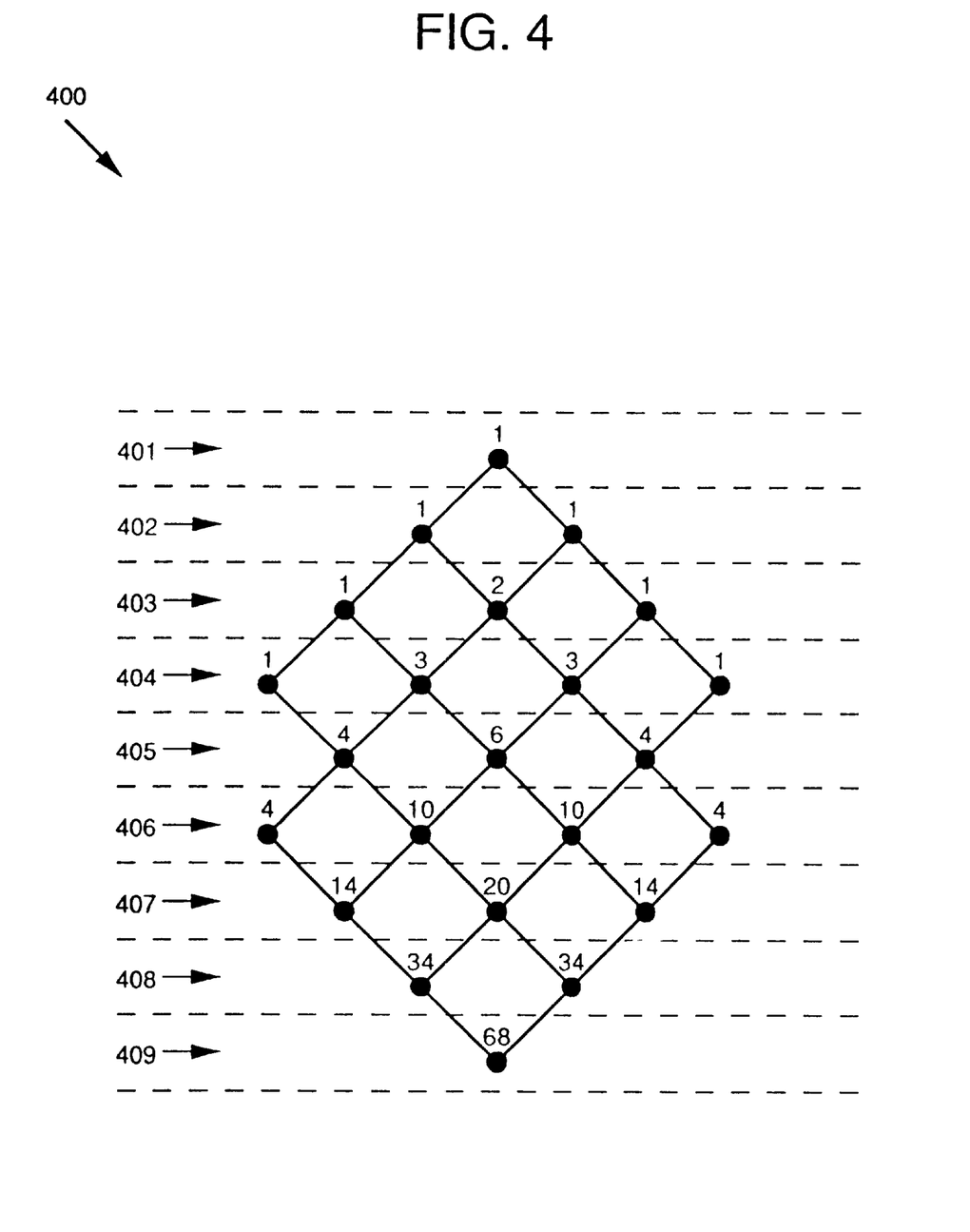
FIG. 4 is a trellis 400 for a set of balanced binary codewords of length 8, in accordance with the present invention.

For example, FIG. 4 is a trellis 400 for the set of balanced binary codewords of length 8 whose digital sum variance (DSV), or imbalance of the prefix, is no greater than three. This means that each eight bit codeword is balanced—it has four 0's and four 1's. For any bit position, the prefix at that position has no more than three more 1's than 0's or three more 0's than 1's. The levels of the trellis are separated by the dashed lines and are designated levels 401 through 409. The top level of the trellis, level 401, is the level where d=0. The next level 402, is level d+1=1, and so on for the remaining levels.

At the top level 401 of the trellis, there is only one state. At the bottom level 409 of the trellis, there is only one state. The integer above each state s is the number N(s) of paths from the top state to the state s in the trellis. As a matter of convention, the transitions on 0 are drawn slanting downward to the left and the transitions on 1 are drawn slanting downward to the right.

Each level 401 through 409 of trellis 400 corresponds to a bit position in the resulting codeword. To generate a codeword using trellis 400, start at top level 401. This level corresponds to a bit position before the first bit of the codeword, so no bits of the codeword have yet been defined. A transition is selected which corresponds to the first bit of the codeword. For example, assume the first transition is a 1. This transition is down and to the right on trellis 400. The current state is the rightmost state of level 402. The currently defined prefix is "1". Assume two more 1 transitions. The current state is the rightmost state of level 404. The currently defined prefix is "111". Because the DSV of this code is three, the prefix cannot contain more than three more 1's than 0's. Therefore, no 1 transition is allowed from this state. The next transition must be a 0, which leads to the rightmost state of level 405. The currently defined prefix is now "1110". Assume the next transition is a 1. The current state is now the rightmost state of level 406. The currently defined prefix is now "11101". Because the overall codeword is balanced, there are four 1's in each codeword. The current prefix already has four 1's. Therefore, the three remaining transitions must be 0's. This leads to the bottom state at level 409. The currently defined prefix is the entire codeword and is "11101000". The state at level 409 has 68 possible prefixes, thus, this code has 68 different codewords.

In practice, a series of datawords are encoded to form a series of codewords. Thus, the trellis is used repeatedly, looping back from the bottom level state to the top level state. In fact, the bottom level state is the same state as the top level state at a time one time block unit later. The bottom level state is entered after all bits of the current codeword have been defined. This is the same as the state before any bits of the next codeword have been defined, which is the top level state.

Figure 5:
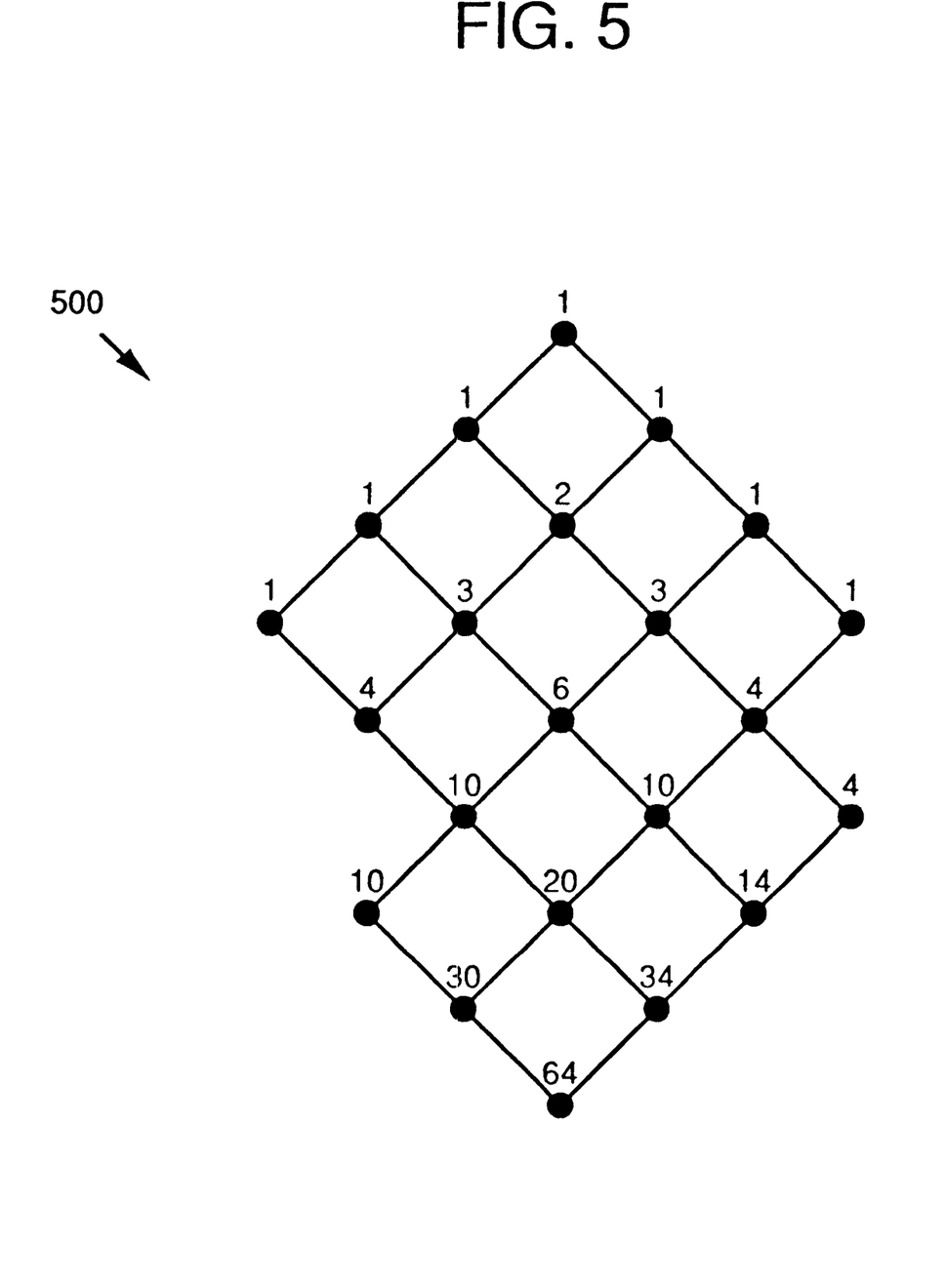
FIG. 5 is a trellis 500 for another set of balanced binary codewords of length 8, in accordance with one embodiment of the present invention.

FIG. 5 is a trellis for a block code which encodes a six-bit dataword into an eight-bit codeword. This trellis is similar to the trellis of FIG. 4, except that the four codewords ending in "111" have been omitted. To accomplish this, the trellis of FIG. 5 was modified by removing the leftmost state of level 406, the only state from which it had been possible (in exactly four ways) to conclude a code wird with three 1 bits. In order to encode a six-bit dataword, only sixty-four codewords are needed, thus four codewords have been omitted.

Figure 6:
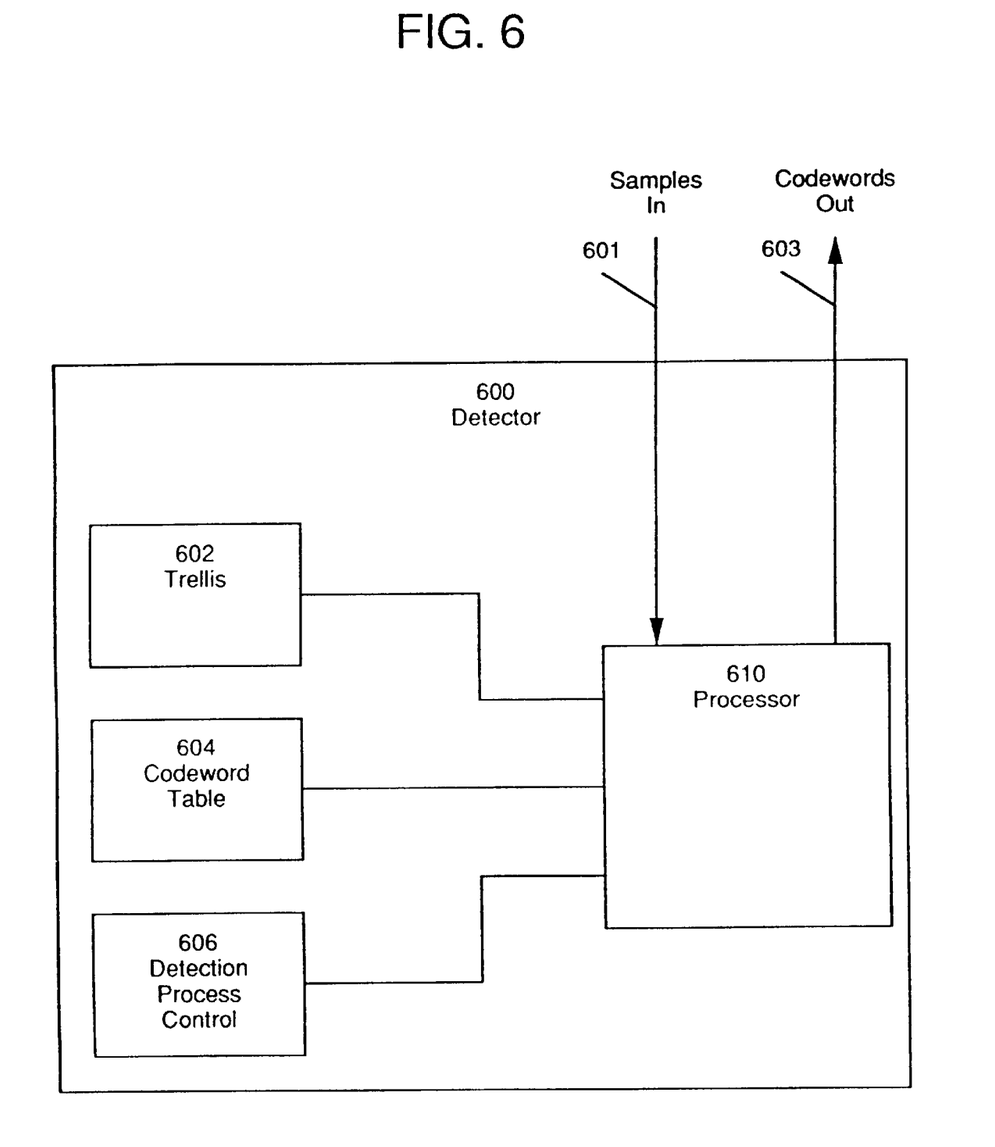
FIG. 6 is a block diagram of a detector 600, in accordance with the present invention, which converts a sequence of samples into the codeword of the code defined a trellis, such as that shown in FIG. 5, which has the greatest correlation with the sequence, using the Viterbi process.

FIG. 6 is a block diagram of a detector 600, which converts a sequence of samples into the codeword of the code defined by the trellis of FIG. 5, which has the greatest correlation with the sequence, using the Viterbi process. Detector 600 accepts a stream of sequences of samples from an analog to digital converter on its input 601. Detector 600 outputs a stream of codewords on its output 603. Detector 600 includes a trellis container 602, which contains the trellis which defines the code being detected. Codeword table 604 contains all codewords in the code being detected. Processor 610, which is coupled to input 601, output 603, trellis container 602 and codeword table 604, carries out the detection process under the control of detection process control 606.

Detector 600 may be implemented in a general purpose, programmable computer, in which trellis container 602 and codeword table 604 are stored in memory and processor 610 is the central processing unit of the computer. The memory in such a computer is typically random access memory, although read only memory, programmable read only memory, electrically erasable programmable read only memory, etc., may be used in some applications. Trellis container 602 and codeword table 604 may also be stored on a mass storage device, such as a hard disk drive, floppy disk drive, tape drive, optical drive, magneto-optic drive or holographic storage device.

Detector 600 may also be implemented in dedicated circuitry. Trellis container 602 and codeword table 604 may be contained by a variety of storage devices, such as random access memory chips, read only memory chips, programmable read only memory chips, electrically erasable read only memory chips, programmable array logic chips, gate array chips, programmable gate array chips, custom integrated circuits, or portions thereof, etc. Likewise, processor 610 may be implemented by discrete logic, programmable array logic chips, gate array chips, programmable gate array chips, custom integrated circuits, or portions thereof, etc. The precise implementation is dependent on external factors such as the cost or size of the resulting system, the performance level desired, etc. All these variations implement the detection process and are, for the purposes of the present invention, equivalent.

Figure 7:
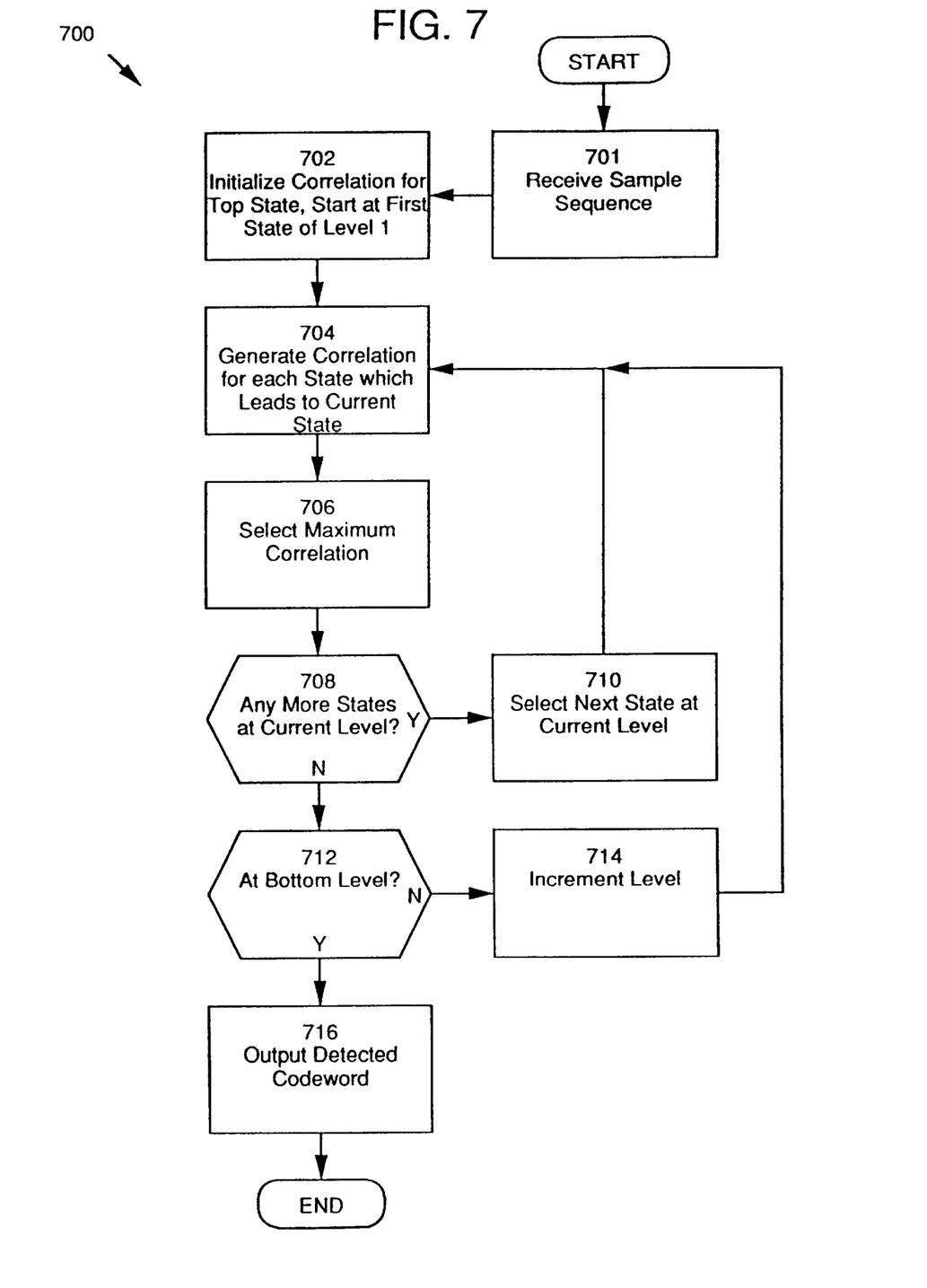
FIG. 7 is a flow diagram of a process 700, in accordance with the present invention, which is implemented in detector 600 of FIG. 6.

FIG. 7 is a flow diagram of an input sample-to-codeword process 700 which is implemented in detector 600 of FIG. 6. Process 700 uses a trellis, such as that shown in FIG. 5, to detect which codeword b to output based on an input sample sequence y. The Viterbi process iteratively determines the correlations and codewords for each state s at each level of the trellis based on the correlations at the preceding level.

The process begins with step 701, in which a sequence of samples is received. In step 702, the correlation for the top state, denoted c(top state), is set equal to 0. The current state being processed, s, is selected to be the first state of level 1. The current level is denoted d, so d is set equal to 1. In step 704, the correlation at state s for each state at the previous level which leads to state s is generated in accordance with:

$$c(s',s)=c(s')+a(s',s)y_{d-1},$$

where s is the current state, s' is the state at the previous level, c(s) is the correlation at the current state, c(s') is the correlation at state s', a(s',s) is the label (0 or 1) of the transition which leads from state s' to state s, and $y_{d-1}$ is the value of sample d−1. In step 706, the maximum correlation among those generated in step 704 is selected. The correlation of state s, c(s), is set equal to this maximum. The previous state, s', which produces this maximum is denoted $s'_{max}$. The codeword at state s, denoted p(s), may be determined by concatenating the value of the transition label from state $s'_{max}$ to state s, $a(s'_{max},s)$, to the end of the codeword at state $s'_{max}$, $P(s'_{max})$.

In step 708, it is determined whether there are any more states at the current level which have not been processed. If so, the process goes to step 710, in which the next state at the current level is selected. The process then loops back to step 704. Steps 704 through 710 are preferably implemented in parallel for all states, s, at level d, but may also be performed sequentially. If there are no more states at the current level, the process goes to state 712, in which it is determined whether the process is at the bottom level. If not, the process goes to step 714, in which the level is incremented. The process then loops back to step 704. If the process is at the bottom level, the process goes to step 716, in which the complete detected codeword, p(bottom state) is output.

Figure 8A:
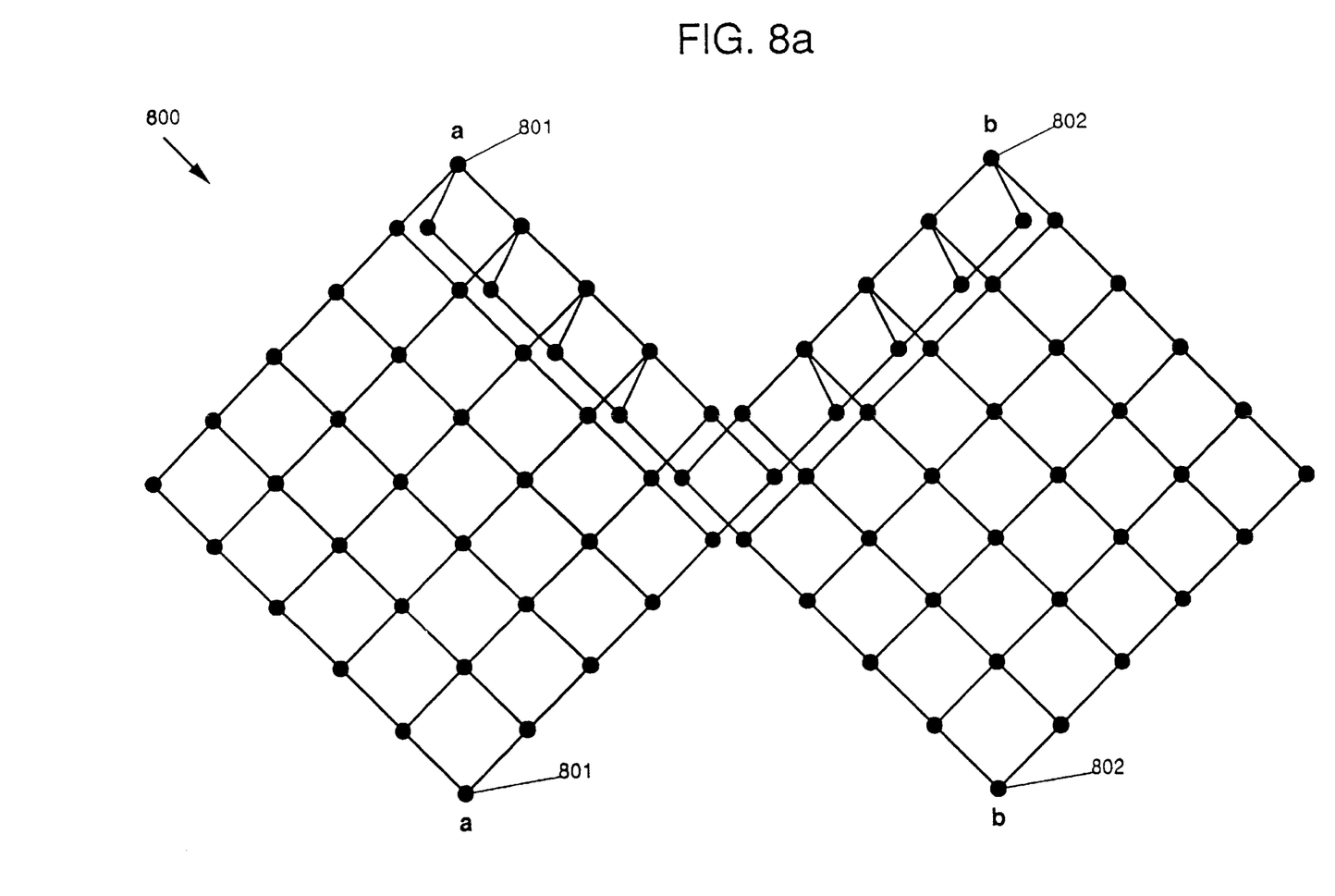
FIG. 8a is the trellis 800 of a rate 8:10 DC free finite-state code, in accordance with another embodiment of the present invention.

FIG. 8a is the trellis 800 of a rate 8:10 DC free finite-state code. While in a balanced code, every codeword has the same number of 0's as 1's, this is not true of a DC free code. In a DC free code, some codewords have more 0's than 1's and some codewords have more 1's than 0's. However, in a DC free code, the imbalance of arbitrarily long sequences of multiple codewords is bounded.

A trellis description of a finite-state code is a trellis, similar to that of a block code, except that there may be more than one top state and more than one bottom state. The set of bottom states is always the same as the set of top states, at one time block unit later. Each connection in the trellis may be labeled by several distinct words of a given length (the same length for all connections). The codewords are the sequences obtained by traversing the trellis from a top state to a bottom state. For example, in FIG. 8a, trellis 800 has two top level states, state a 801 and state b 802. Likewise, trellis 800 has two bottom level states, state a 801 and state b 802, which are the same states as the top level states.

It is to be noted that some states in trellis 800 have more than two exit paths. For example, state a 801 has one 1 transition exit path and two 0 transition exit paths.

In a DC-free code, each state s is associated with an integer, i(s), such that, given any pair of states s and t, all words generated by paths from s to t in the trellis have $i(s)-i(t)$ more 1's than 0's This forces the desired bounded imbalance. In the trellis of FIG. 8a, the imbalance from a to a, i(a)=0, and the imbalance from a to b, i(b)=8.

The detection process for a finite state code based on a trellis such as trellis 800 of FIG. 8a, again uses a correlation measure to estimate the binary codeword from the corresponding intensity sample sequence. Given a top state s, which can be either state a 801 or state b 802, a bottom state t, which can be either state a 801 or state b802, a part of the detection process finds the path taken by the encoder from state s to state t whose generated codeword b maximizes the correlation <b,y> with the corresponding intensity sample sequence y. Thus, in an entirely analogous way to the block encoder case, the Viterbi process will determine for each choice of bottom state t, the combination of top state s and codeword which maximizes the correlation of the received word with the codewords labeling paths from s to t. This gives one choice of codeword for each bottom state t. The actual detected codeword will, in general, be determined by a number, m, called the path memory length, of iterations of this process. This is further described below.

Figure 8B:
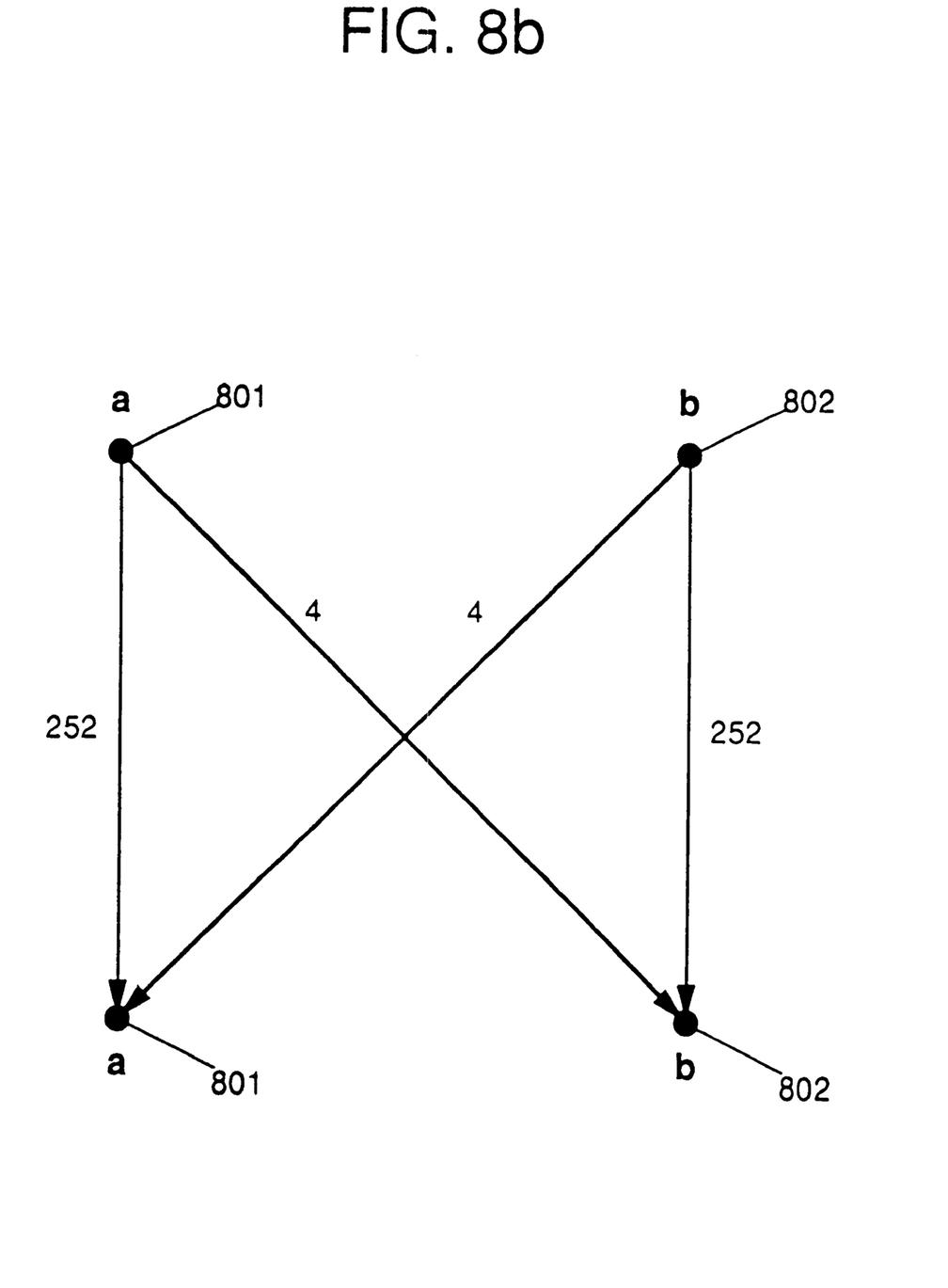

FIG. 8b is a simplified representation of trellis 800 of FIG. 8a. As shown in FIG. 8b there are 252 paths through trellis 800 from state a 801 to state a 801. Each of these 252 paths generates a balanced codeword of length 10. Likewise, there are 252 paths from state b 802 to state b 802. Each of these 252 paths generates a balanced codeword of length 10. There are 4 paths through trellis 800 from state a 801 to state b 802, each generating a codeword having an imbalance of 8. There are also 4 paths through trellis 800 from state b 802 to state a 801, each generating a codeword having an imbalance of −8. Any encoding sequence which starts at state a 801 and ends at state a 801, or which starts at state b 802 and ends at state b 802, is balanced, no matter how long the sequence or how many transitions from state a 801 to state b 802, or from state b 802 to state a 801, have occurred.

The eight-bit datawords should be assigned to transitions in such a way that if a transition from state a to state a and a transition from state b to state b generate the same balanced codeword, then the two transitions are assigned the same eight-bit dataword. This will prevent error propagation.

Figure 9:
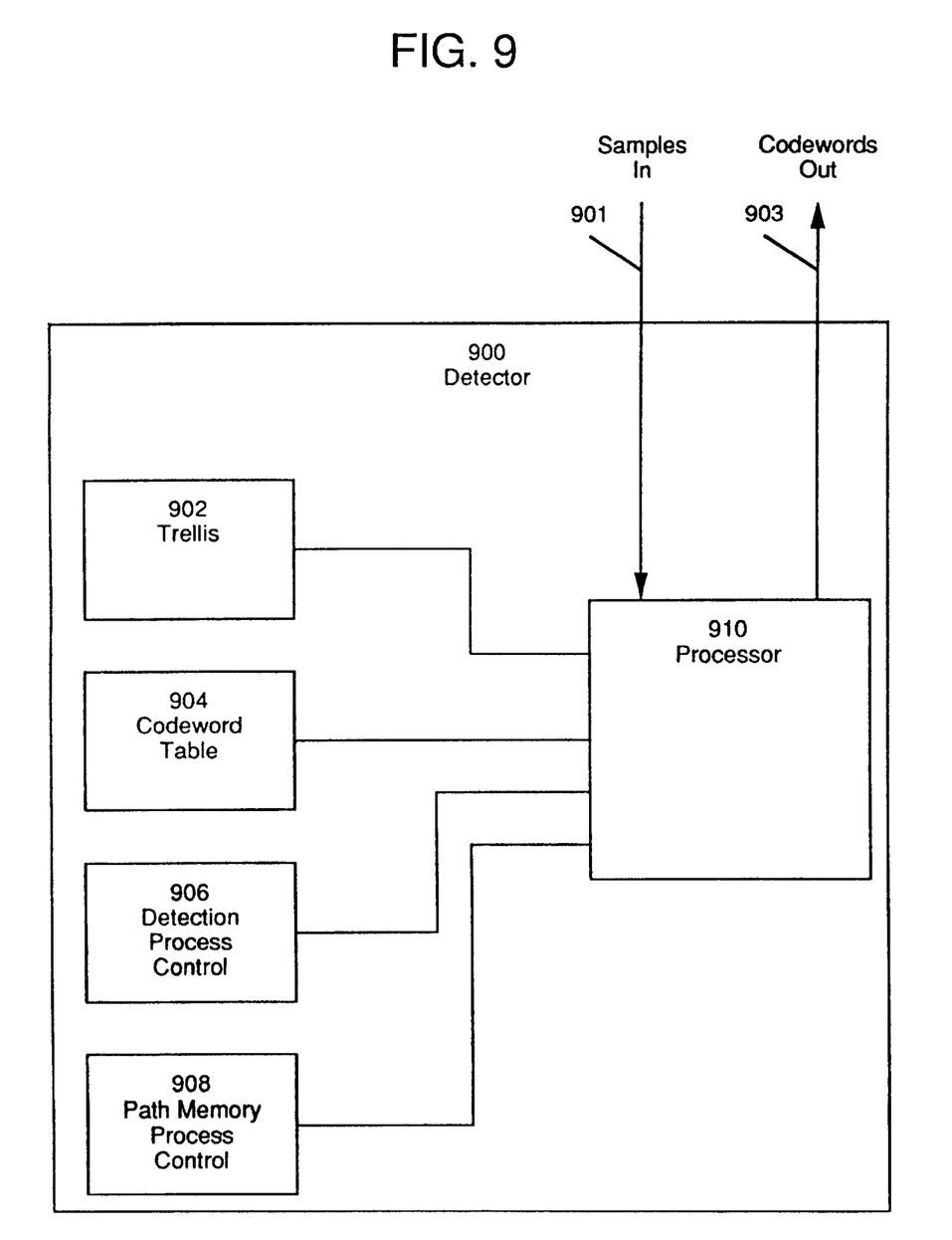
FIG. 9 is a block diagram of a detector 900, in accordance with the present invention, which converts a sequence of samples into the codeword of the code defined by a trellis, such as that shown in FIG. 8, which has the greatest correlation with the sequence, using the Viterbi process.

FIG. 9 is a block diagram of a detector 900 which converts a sequence of samples into the codeword of the code defined by a trellis such as that shown in FIG. 8, which has the greatest correlation with the sequence, using the Viterbi process. The detector 900 substantially resembles the detector 600 of FIG. 6, except for the addition of a path memory process control 908 (discussed below).

The detector 900 accepts a stream of sequences of samples from an analog to digital converter on its input 901. The detector 900 outputs a stream of codewords on output 903. The detector 900 includes a trellis container 902, which contains the trellis which defines the code being detected. A codeword table 904 contains all codewords in the code being detected. A processor 910, which is coupled to the input 901, the output 903, the trellis container 902 and the codeword table 904, carries out the detection process under the control of a detection process control 906 and a path memory process control 908.

The detector 900 may be implemented in a general purpose, programmable computer, in which trellis container 902 and codeword table 904 are stored in memory and processor 910 is the central processing unit of the computer. The memory in such a computer is typically random access memory, although read only memory, programmable read only memory, electrically erasable programmable read only memory, etc., may be used in some applications. Trellis container 902 and codeword table 904 may also be stored on a mass storage device, such as a hard disk drive, floppy disk drive, tape drive, optical drive, magneto-optic drive or holographic storage device.

Detector 900 may also be implemented in dedicated circuitry. Trellis container 902 and codeword table 904 may be contained by a variety of storage devices, such as random access memory chips, read only memory chips, programmable read only memory chips, electrically erasable read only memory chips, programmable array logic chips, gate array chips, programmable gate array chips, custom integrated circuits, or portions thereof, etc. Likewise, processor 910 may be implemented by discrete logic, programmable array logic chips, gate array chips, programmable gate array chips, custom integrated circuits, or portions thereof, etc. The precise implementation is dependent on external factors such as the cost or size of the resulting system, the performance level desired, etc. All these variations implement the detection process and are, for the purposes of the present invention, equivalent.

Figure 10:
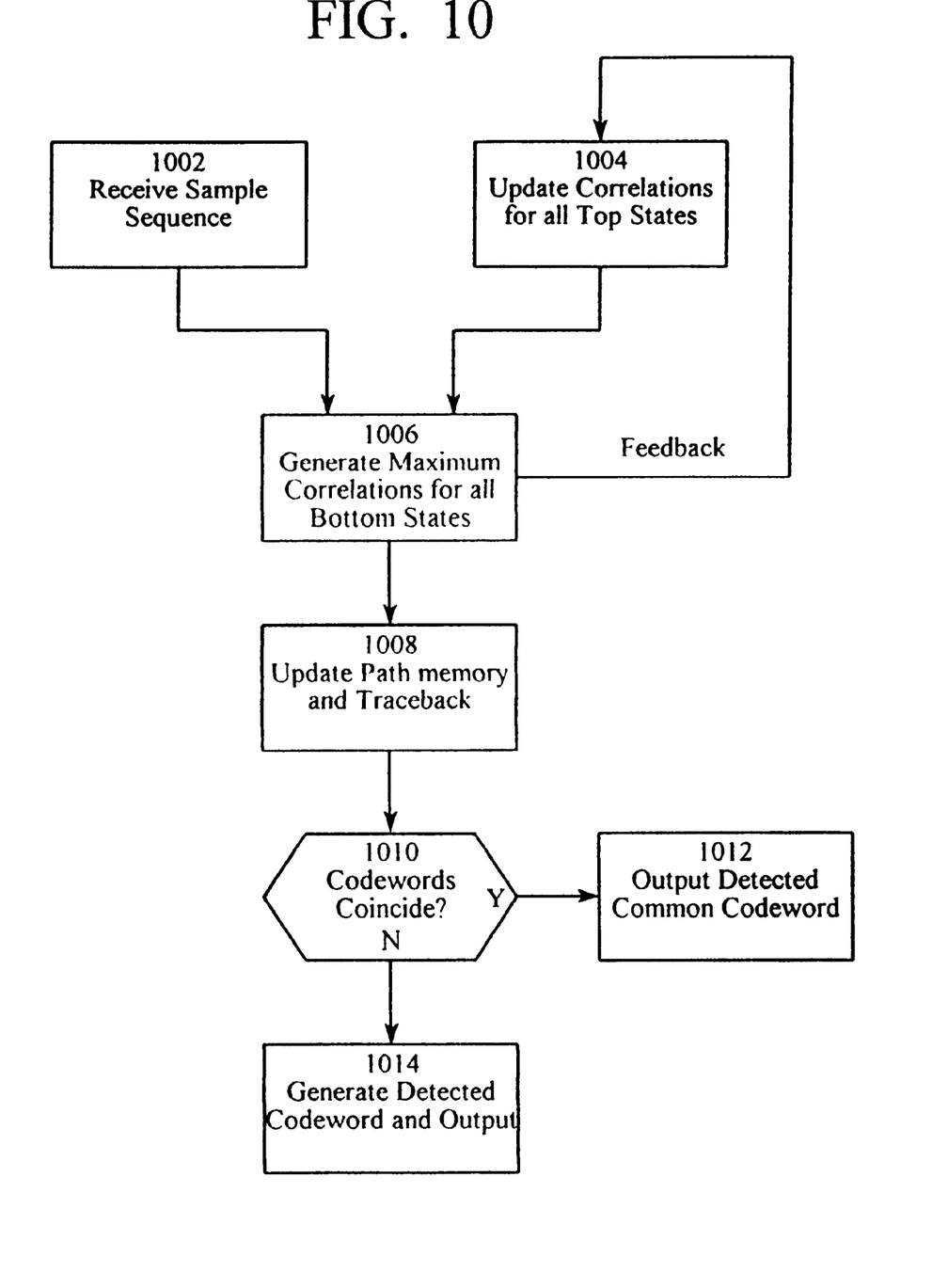
FIG. 10 is a flow diagram of a process 1000, in accordance with the present invention, which is implemented in detector 900 of FIG. 9.

FIG. 10 is a flow diagram of a process 1000 which is implemented in detector 900 of FIG. 9. Process 1000 uses a trellis such as that shown in FIG. 8 to detect which codeword b to output based on an input sample sequence y. The process begins with step 1002, in which a sequence of samples is received. In step 1004, correlations, $c^{k-1}(s)$, from the previous time block unit, k−1, are accepted as inputs. When k=1, the correlation at one arbitrary initial state $s_0$ is set to 0 and the others are set to −∞. In step 1006, for each choice of bottom state t, the basic correlation unit computes the maximum correlation, denoted $c^k(t)$, of the received word$^k$y with all codewords obtained by traversing the trellis from a top state to t. The process underlying this step is similar to process 700 of FIG. 7. The codeword that produces the maximum correlation $c^k(t)$ is denoted $p^k(t)$. The top state from which $p^k(t)$ is generated is denoted $s^k(t)$. The correlations $c^k(t)$ are fed back to step 1004 for use at the next time block unit, and the $p^k(t)$ and $s^k(t)$ are fed to step 1008, in which, for each codeword corresponding to each bottom state t, $p^k(t)$, the path memory traces back to find the corresponding codeword $w^{k-m+1}(t)$ at time block unit k−m+1 that leads to state t at time slot k. In step 1010, it is determined whether the codewords $w^{k-m+1}(t)$ coincide. If, for all states t, the codewords $w^{k-m+1}(t)$ coincide, then that common codeword is the output. Otherwise, the output is the codeword $w^{k-m+1}(t)$ for which t maximizes the bias-adjusted correlations $c^k(t)-e(t)\mu$, where e(t) is the excess of 1's over 0's ($e(t)=i(t)-i(s_o)$) among all words traversed from $s_o$ to t and $\mu$ is the estimated mean intensity of the samples in the sample sequence. In the 8:10 code of trellis 800 of FIG. 8a, the path memory length, m, is chosen to be 2.

Figure 11:
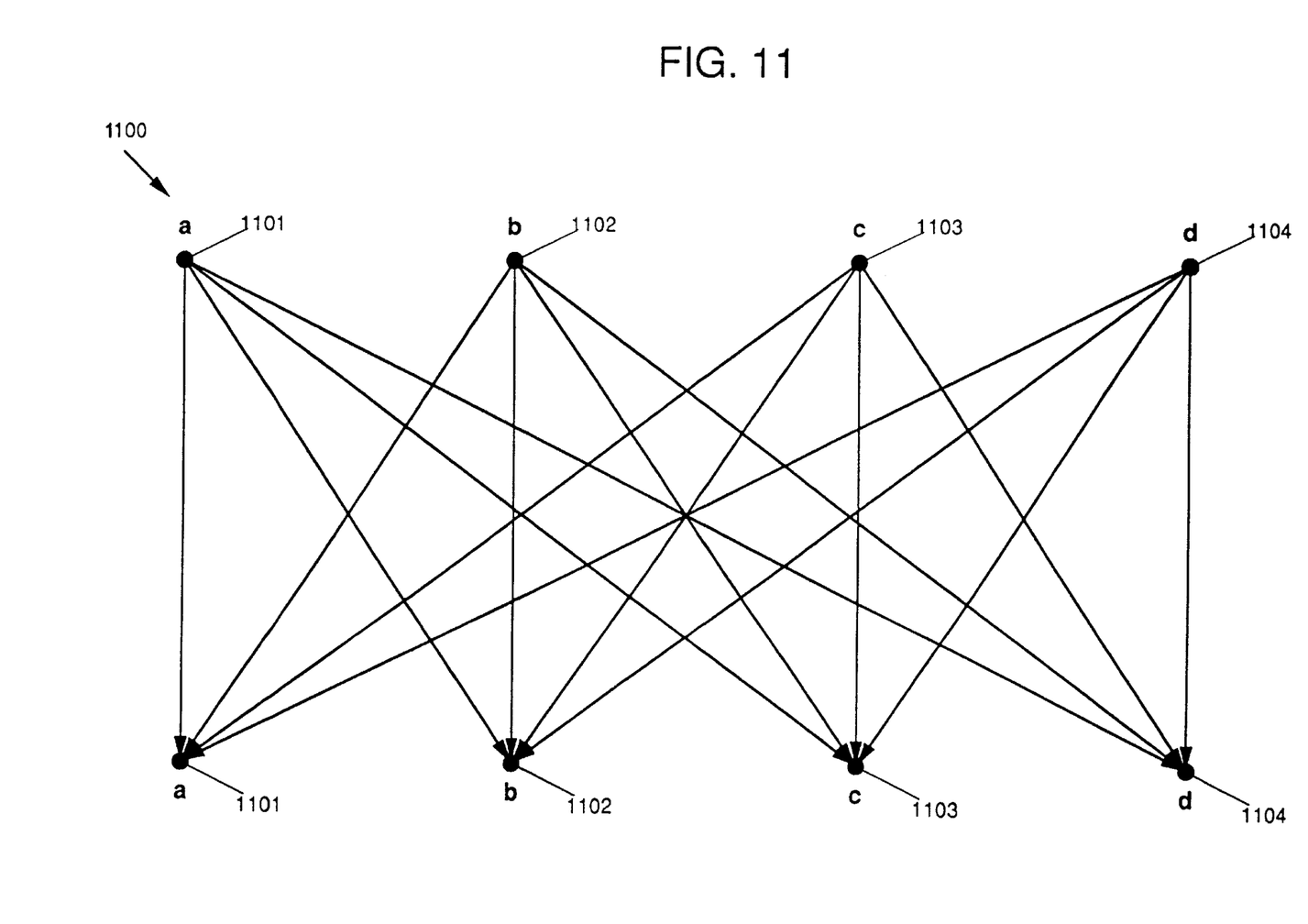
FIG. 11 is the trellis 1100 of a rate 8:12 balanced finite-state code, in accordance with another embodiment of the present invention.

FIG. 11 is the trellis 1100 of a rate 8:12 balanced finite-state code. Trellis 1100 has four top level states, state a 1101, state b 1102, state c 1103 and state d 1104. Likewise, trellis 1100 has four bottom level states, state a 1101, state b 1102, state c 1103 and state d 1104, which are the same states as the top level states. Each transition in trellis 1100 represents a set of 64 balanced words of length 12. There are eight such sets, assigned to the transitions as shown in Table A.

TABLE A

| Top State | Bottom State | | | |
|---|---|---|---|---|
| | a | b | c | d |
| a | $S_1$ | $S_2$ | $S_3$ | $S_4$ |
| b | $S_5$ | $S_6$ | $S_7$ | $S_8$ |
| c | $S_2$ | $S_1$ | $S_4$ | $S_3$ |
| d | $S_6$ | $S_5$ | $S_8$ | $S_7$ |

Each set, $S_i$, where i=1 . . . 8, is an arbitrary set of 64 balanced binary words, of values $b_0 \, b_1 b_2 \ldots b_{11}$, of length 12 bits, such that $b_1+2b_2+3b_3 \ldots +11b_{11}-i$ is a multiple of 12.

This code has a minimum distance of 4, which provides enhanced detection capability in the presence of noise. The path memory, m, is chosen to be 3. Since this code is balanced, each e(t)=0 and thus, there is no need to compute the estimated mean intensity $\mu$.

In all of the disclosed codes, the decoder is given as a mapping from codewords back to datawords which inverts the encoder. However, the decoded dataword is allowed to be a function of the current codeword as well as a number of upcoming codewords.

Although specific embodiments of the present invention have been described, it will be understood by those of skill in the art that there are other embodiments which are equivalent to the described embodiment. Accordingly, it is to be understood that the invention is not to be limited by the specific illustrated embodiment, but only by the scope of the appended claims.

What is claimed is:

1. A method for detecting a codeword from a data stream comprising a series of sequences of samples representing intensities of an analog signal, the codeword belonging to a set of codewords having a bounded imbalance, the method comprising the steps of:

receiving a sequence of samples; for which ideal intensity values are not known; and selecting the codeword having the greatest correlation with the sequence of samples, the codeword belonging to a code represented by a trellis shown in FIG. 11, the trellis having states and levels, and the codeword is selected by iteratively determining correlations and codewords for each state at each level of the trellis based on the correlations at the preceding level of the trellis.

2. The method of claim 1, wherein the data stream is output from a holographic storage device.

3. An apparatus for detecting a codeword from a data stream comprising a series of sequences of samples representing intensities of an analog signal, comprising:

a codeword table container, containing a representation of a set of codewords comprising a block encoded balanced code represented by a trellis;

a trellis container, containing a representation of the trellis shown in FIG. 11; and a processing apparatus receiving a sequence of samples for which ideal intensity values are not known and selecting a codeword having the greatest correlation with the sequence of samples by iteratively determining correlations and codewords for each state at each level of the trellis based on the correlations at the preceding level of the trellis.

4. The apparatus of claim 3, wherein the data stream is output from a holographic storage device.

* * * * *